July 1, 1924.

C. T. ALLCUTT 1,499,325

MEASURING SYSTEM

Filed Sept. 1, 1917

WITNESSES:

INVENTOR
Chester T. Allcutt
BY
ATTORNEY

Patented July 1, 1924.

1,499,325

UNITED STATES PATENT OFFICE.

CHESTER T. ALLCUTT, OF WILKINSBURG, PENNSYLVANIA, ASSIGNOR TO WESTINGHOUSE ELECTRIC & MANUFACTURING COMPANY, A CORPORATION OF PENNSYLVANIA.

MEASURING SYSTEM.

Application filed September 1, 1917. Serial No. 189,346.

*To all whom it may concern:*

Be it known that I, CHESTER T. ALLCUTT, a citizen of the United States, and a resident of Wilkinsburg, in the county of Allegheny and State of Pennsylvania, have invented a new and useful Improvement in Measuring Systems, of which the following is a specification.

My invention relates to measuring systems and particularly to means for, and methods of, determining the maximum value of an alternating-voltage wave.

One object of my invention is to provide a null method of measuring the maximum value of an alternating-voltage wave.

Another object of my invention is to provide a measuring system of the above indicated character that shall be simple to connect and effective in its operation.

In practicing my invention, I provide a hot-cathode rectifier for converting the alternating voltage, the maximum value of which is to be determined, into direct or continuous voltage. A source of continuous voltage is connected to oppose the rectified voltage and a galvanometer is connected therebetween. The continuous voltage is varied until the galvanometer indicates a zero reading and the continuous voltage is measured. The maximum value of the alternating voltage will correspond to the continuous voltage required to effect a zero reading of the galvanometer. By the use of such a system, the voltage or electromotive force wave will not be distorted by reason of the current consumed in the measuring instrument and, thus, it particularly adapts itself to the measurement of peaked alternating-voltage waves.

Figure 1:
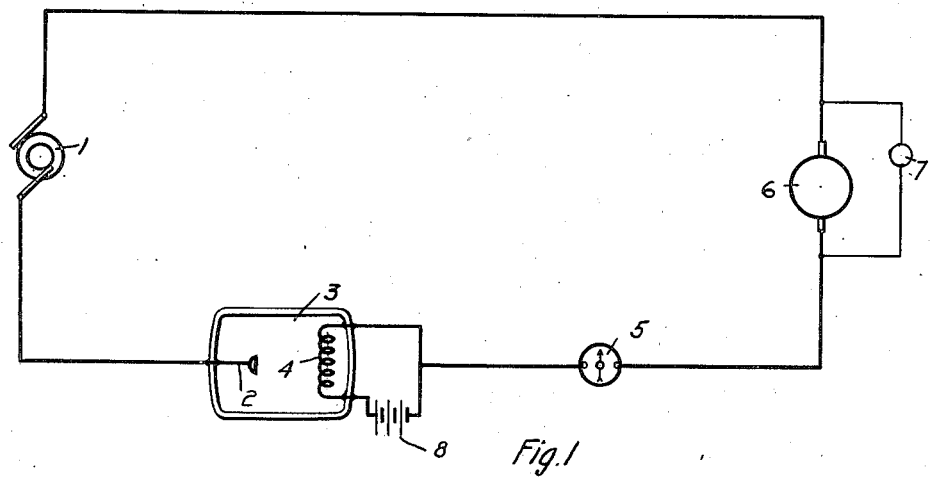
Figure 2:
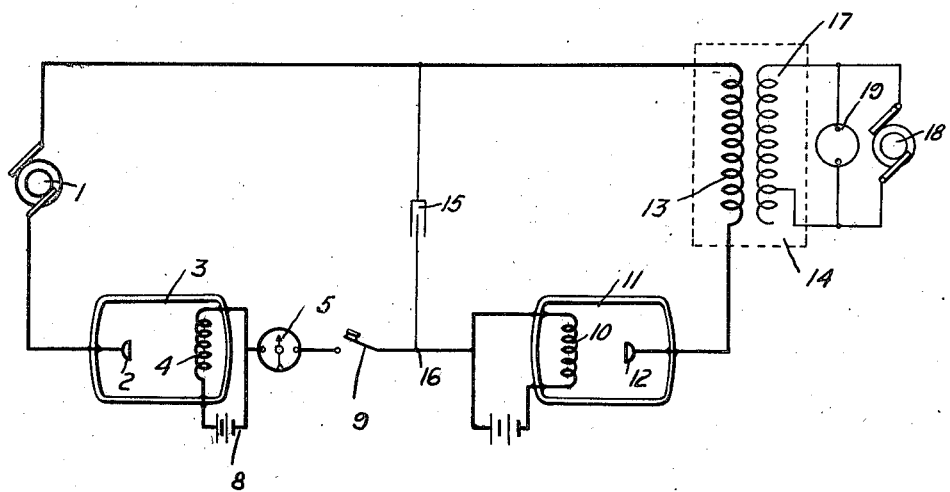

Figure 1 of the accompanying drawings is a diagrammatic view of a measuring system embodying my invention, and Fig. 2 is a diagrammatic view of a modified form of measuring system embodying my invention.

One terminal of a source 1 of alternating electromotive force or voltage is connected to the anode 2 of a hot-cathode rectifier 3 the cathode 4 of which is connected to one terminal of a galvanometer 5. The other terminal of the galvanometer 5 is connected to one terminal of a source 6 of continuous voltage, the other terminal of which is connected to the other terminal of the source 1 of alternating voltage. A voltmeter 7 is connected across the terminals of the source 6 of continuous voltage. A source 8 of direct or continuous current is so connected to the cathode 4 of the rectifier 3 as to effectively heat the same and thus permit it to function properly as a rectifier.

When it is desired to determine the maximum value of the voltage wave of the source 1 of alternating voltage, the source 6 of continuous voltage is varied until the galvanometer 5 indicates zero. Under this condition, no current will traverse the galvanometer 5 and the reading of the voltmeter 7 will be an indication of the maximum value of the alternating voltage. Since no current traverses the galvanometer 5, no distortion will result, and the maximum value of relatively high peaked voltage waves may be accurately obtained.

In Fig. 2 of the drawings, one terminal of the source 1 of alternating voltage is connected to the anode 2 of the rectifier 3, the cathode 4 of which is connected to one terminal of the galvanometer 5. The other terminal of the galvanometer 5 is connected, through a switch 9, to the cathode 10 of a rectifier 11. The anode 12 of the rectifier 11 is connected to one terminal of the secondary winding 13 of a variable-voltage transformer 14. The other terminal of the winding 13 is connected to the other terminal of the source 1 of alternating voltage. A condenser 15 is connected to one terminal of the winding 13 and to a point 16 between the switch 9 and the cathode 10. The primary winding 17 of the transformer 14 is connected to a source 18 of alternating voltage. A voltmeter 19 is connected across the terminals of the winding 17 for the purpose of comparing the voltages of the sources 1 and 18.

In operation, with the switch 9 open, the condenser 15 will become charged to the maximum voltage value across the winding 13, which voltage is proportional to the maximum voltage value of the source 18. If this voltage is higher than the peak voltage of the source 1, when the switch 9 is closed, there will be no deflection of the galvanometer 5 because the condenser is already charged to a value above that of the source 1 and is prevented from discharging through the circuit including the source 1 by the rectifier 3.

However, if the maximum voltage value of the source 1 is greater than the maximum voltage value of the winding 13, or is caused to be greater by adjusting the transformer 14, the galvanometer will be momentarily deflected, when the switch 9 is closed. Under this condition, the transformer 14 may be adjusted to gradually raise the voltage of the winding 13, the switch 9 being closed at intervals, until the first step in the adjustment of the transformer 14 is reached at which there is no observable deflection of the galvanometer when the switch 9 is closed. The setting of the transformer 14 at this point gives an indication of the value of the voltage of the source 1.

By this method, any two values of alternating voltages may be compared, irrespective of their relative phase-angular relations or frequencies.

I do not limit my invention to the particular arrangement illustrated, as it may be variously modified without departing from the spirit and scope of the invention as set forth in the appended claims.

I claim as my invention:

1. A measuring system comprising a source of known alternating voltage, a source of unknown alternating voltage, means for converting both of said alternating voltages to unidirectional voltages, a condenser adapted to be charged by one of said unidirectional voltages and indicating means connected between said means.

2. A measuring system comprising two sources of alternating voltage, two vacuum-bulb converters having the unidirectional voltage sides thereof connected each to each and together being connected in a series circuit including both of said sources of alternating voltage, a condenser connected at one end between said converters and at the other end between said sources of alternating voltage and indicating means connected between said converters.

3. A measuring system comprising two sources of alternating voltage, means for changing said alternating voltages to unidirectional voltage, said means having the unidirectional sides thereof connected together and the alternating-voltage sides thereof connected to said sources, a condenser connected at one terminal between said means and at the other terminal between said sources, and indicating means disposed between said means.

In testimony whereof, I have hereunto subscribed my name this 21st day of August, 1917.

CHESTER T. ALLCUTT.